(12) United States Patent
Oki et al.

(10) Patent No.: US 12,065,568 B2
(45) Date of Patent: Aug. 20, 2024

(54) POROUS SPHERICAL SILICONE RUBBER PARTICLES, POROUS SILICONE COMPOSITE PARTICLES, AND METHOD FOR PRODUCING THESE PARTICLES

(71) Applicant: SHIN-ETSU CHEMICAL CO., LTD., Tokyo (JP)

(72) Inventors: Takahito Oki, Annaka (JP); Yoshinori Inokuchi, Annaka (JP); Shunji Aoki, Annaka (JP); Tsuneo Kimura, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 763 days.

(21) Appl. No.: 17/273,900

(22) PCT Filed: Aug. 30, 2019

(86) PCT No.: PCT/JP2019/034132
§ 371 (c)(1),
(2) Date: Mar. 5, 2021

(87) PCT Pub. No.: WO2020/050168
PCT Pub. Date: Mar. 12, 2020

(65) Prior Publication Data
US 2021/0238422 A1 Aug. 5, 2021

(30) Foreign Application Priority Data

Sep. 6, 2018 (JP) .................... 2018-166492

(51) Int. Cl.
| | | |
|---|---|---|
| *C08L 83/06* | (2006.01) | |
| *C08J 3/12* | (2006.01) | |
| *C08J 9/26* | (2006.01) | |

(52) U.S. Cl.
CPC ............... *C08L 83/06* (2013.01); *C08J 3/12* (2013.01); *C08J 9/26* (2013.01); *C08J 2383/05* (2013.01); *C08J 2383/06* (2013.01)

(58) Field of Classification Search
CPC ..................................................... C08L 83/06
See application file for complete search history.

(56) References Cited

U.S. PATENT DOCUMENTS

| | | | |
|---|---|---|---|
| 3,960,786 | A | 6/1976 | Akiyama |
| 4,892,726 | A | 1/1990 | Yonekura et al. |
| (Continued) | | | |

FOREIGN PATENT DOCUMENTS

| | | |
|---|---|---|
| CN | 105540532 A | 5/2016 |
| EP | 2 581 415 A1 | 4/2013 |
| (Continued) | | |

OTHER PUBLICATIONS

English language machine translation of CN 105540532 (Year: 2016).*

(Continued)

*Primary Examiner* — Megan McCulley
(74) *Attorney, Agent, or Firm* — Birch, Stewart, Kolasch & Birch, LLP (57) ABSTRACT

The present invention provides: porous spherical silicone rubber particles which have high light scattering performance; porous silicone composite particles; and a method for producing these particles. The porous spherical silicone rubber particles have pores inside the particles or in the surfaces of the particles.

18 Claims, 4 Drawing Sheets

(56) References Cited

U.S. PATENT DOCUMENTS

| | | |
|---|---|---|
| 2006/0084758 A1 | 4/2006 | Morita |
| 2006/0293431 A1 | 12/2006 | Kani et al. |
| 2011/0129672 A1 | 6/2011 | Aratani et al. |
| 2011/0142893 A1 | 6/2011 | Ishikawa et al. |
| 2011/0171157 A1 | 7/2011 | Aratani et al. |
| 2011/0224308 A1 | 9/2011 | Saito et al. |
| 2014/0322280 A1 | 10/2014 | Inokuchi |

FOREIGN PATENT DOCUMENTS

| | | |
|---|---|---|
| JP | 50-12143 A | 2/1975 |
| JP | 63-297313 A | 12/1988 |
| JP | 9-20631 A | 1/1997 |
| JP | 8-12524 A | 1/1998 |
| JP | 2000-191788 A | 7/2000 |
| JP | 2003-301047 A | 10/2003 |
| JP | 2004-210944 A | 7/2004 |
| JP | 2004-359592 A | 12/2004 |
| JP | 2006-342165 A | 12/2006 |
| JP | 2010-196010 A | 8/2010 |
| JP | 2011-1537 A | 1/2011 |
| JP | 2011-57785 A | 3/2011 |
| JP | 2014-118444 A | 6/2014 |
| JP | 2014-162920 A | 9/2014 |
| JP | 2014-214263 A | 11/2014 |
| WO | WO 2011/074066 A1 | 8/2011 |
| WO | WO 2011/111179 A1 | 9/2011 |

OTHER PUBLICATIONS

Extended European Search Report for corresponding European Application No. 19858507.7, dated May 6, 2022.
International Search Report (PCT/ISA/210) issued in PCT/JP2019/034132, dated Nov. 26, 2019.
Written Opinion of the International Searching Authority (PCT/ISA/237) issued in PCT/JP2019/034132, dated Nov. 26, 2019.
Chinese Office Action and Search Report for corresponding Chinese Application No. 201980058034.7, dated Aug. 3, 2022.

* cited by examiner

POROUS SPHERICAL SILICONE RUBBER PARTICLES, POROUS SILICONE COMPOSITE PARTICLES, AND METHOD FOR PRODUCING THESE PARTICLES

TECHNICAL FIELD

This invention relates to spherical porous silicone rubber particles, porous silicone composite particles, and methods for producing these particles.

BACKGROUND ART

From the past, various silicone particles of spherical shape are used in cosmetics for the purpose of imparting spreadability and feels on use like dryness and smoothness.

For example, there are already known a cosmetic composition containing polymethylsilsesquioxane powder (Patent Document 1: JP-A S63-297313), a makeup cosmetic composition containing spherical silicone rubber powder (Patent Document 2: JP-A H08-12524), and a cosmetic composition containing composite silicone powder in the form of spherical silicone rubber microparticles coated with polyorganosilsesquioxane resin (Patent Document 3: JP-A H09-20631).

Also, when blended in makeup cosmetics such as foundation, spherical silicone particles are able to impart a soft-focus effect of giving a natural finish without unnatural luster. For example, the silicone powder obtained from the method of Patent Document 3 is expected to improve the soft-focus effect on cosmetics, because the polyorganosilsesquioxane coated on silicone particles has a particle size of about 100 nm, and the polyorganosilsesquioxane itself scatters light.

It is also proposed to provide spherical silicone particles with a multiplicity of irregularities on their surface or to tailor silicone particles to a non-spherical shape for improving light scattering. For example, Patent Document 4 (JP-A 2004-359592) describes polyorganosilsesquioxane particles having protrusions on their surface. Patent Document 5 (JP-A 2000-191788) describes spherical organosilicone microparticles having a multiplicity of dimples on their surface. Patent Document 6 (JP-A 2011-1537) describes irregular-shaped hollow organosilicone microparticles of spindle shape having a multiplicity of dimples on their surface. Patent Document 7 (JP-A 2011-57785) describes irregular-shaped organosilicone microparticles of generally polyhedral shape having six or more faces each of which is concave. Patent Document 8 (WO 2011/074066) describes organosilicone microparticles generally configured in spherical shape and having on their surface a plurality of irregular-shaped faces and a network convex portion surrounding the irregular-shaped faces. Patent Document 9 (WO 2011/111179) describes organosilicone microparticles generally configured to have a surface corresponding to each of the faces of a tetrahedron which surface is provided with a recess having a generally circular opening.

PRIOR ART DOCUMENTS

Patent Documents

Patent Document 1: JP-A S63-297313
Patent Document 2: JP-A H08-12524
Patent Document 3: JP-A H09-20631
Patent Document 4: JP-A 2004-359592
Patent Document 5: JP-A 2000-191788
Patent Document 6: JP-A 2011-1537
Patent Document 7: JP-A 2011-57785
Patent Document 8: WO 2011/074066
Patent Document 9: WO 2011/111179

SUMMARY OF INVENTION

Technical Problem

However, since the above-described polyorganosilsesquioxane particles and organosilicone microparticles are all made of hard materials such as resins, they fail to impart a soft feel to cosmetics. It is recently considered important that makeup cosmetics such as foundation have a natural finishing feel (or unadorned skin feel) rather than artificial feel. It is required to impart higher light scattering properties using silicone rubber particles.

An object of the invention, which has been made under the above-mentioned circumstances, is to provide spherical porous silicone rubber particles having high light scattering properties which are expected to impart a high soft-focus effect when used in makeup cosmetics such as foundation, porous silicone composite particles, and methods for preparing these particles.

Solution to Problem

Making extensive investigations to attain the above object, the inventors have found novel spherical porous silicone rubber particles having spherical or semispherical pores in the interior or on the surface thereof, especially spherical porous silicone rubber particles obtained from a W/O/W (inner water phase/oil phase/outer water phase) type emulsion wherein the oil phase component is a curable liquid silicone composition, porous silicone composite particles, and methods for preparing the foregoing particles. The invention is predicated on these findings. The spherical porous silicone rubber particles of the invention have a high light scattering performance and oil absorbing ability by virtue of pores in the interior or on the surface thereof.

Accordingly, the present invention provides the following.

1. Spherical porous silicone rubber particles having pores in the interior or on the surface thereof.
2. The spherical porous silicone rubber particles of 1 wherein the particles have a volume average particle size of 0.5 to 100 μm and the pores are spherical or semispherical and have a diameter of 0.2 to 30 μm.
3. The spherical porous silicone rubber particles of 1 or 2 wherein the silicone rubber is the addition reaction product of an organo(poly)siloxane having at least two silicon-bonded monovalent aliphatic unsaturated groups per molecule with an organohydrogen(poly)siloxane having at least two silicon-bonded hydrogen atoms per molecule, with the proviso that the monovalent aliphatic unsaturated groups and/or the hydrogen atoms are present at least three per molecule.
4. Porous silicone composite particles comprising the spherical porous silicone rubber particles of 1 having spherical polyorganosilsesquioxane deposited on the surface thereof in an amount of 1 to 25% by weight relative to 100% by weight of the spherical porous silicone rubber particles.
5. The porous silicone composite particles of 4 wherein the particles have a volume average particle size of 0.5 to 100 μm and the pores have a diameter of 0.2 to 30 μm.

6. The porous silicone composite particles of 4 or 5 wherein the silicone rubber is the addition reaction product of an organo(poly)siloxane having at least two silicon-bonded monovalent aliphatic unsaturated groups per molecule with an organohydrogen(poly) siloxane having at least two silicon-bonded hydrogen atoms per molecule, with the proviso that the monovalent aliphatic unsaturated groups and/or the hydrogen atoms are present at least three per molecule.

7. A method for preparing the spherical porous silicone rubber particles of any one of 1 to 3, comprising the steps of:
   (i) obtaining a W/O (inner water phase/oil phase) type emulsion consisting of an inner water phase component and an oil phase component composed of a curable liquid silicone composition,
   (ii) obtaining a W/O/W (inner water phase/oil phase/outer water phase) type emulsion consisting of the W/O type emulsion obtained in step (i) and an outer water phase component,
   (iii) curing the curable liquid silicone composition constituting the oil phase in the W/O/W type emulsion obtained in step (ii) in the presence of a catalyst, for yielding a water dispersion of spherical porous silicone rubber particles, and
   (iv) removing water in the outer phase and water in the spherical porous silicone rubber particles from the water dispersion of spherical porous silicone rubber particles obtained in step (iii).

8. A method for preparing the porous silicone composite particles of any one of 4 to 6, comprising the step of subjecting an organotrialkoxysilane to hydrolysis and condensation reactions in the presence of the spherical porous silicone rubber particles obtained from the method of 7, water, and an alkaline substance, for thereby depositing polyorganosilsesquioxane onto the surface of the spherical porous silicone rubber particles.

Advantageous Effects of Invention

The invention provides spherical porous silicone rubber particles having pores in the interior or on the surface thereof. The particles are expected to have a high light scattering performance and oil absorbing ability.

DESCRIPTION OF EMBODIMENTS

[Spherical Porous Silicone Rubber Particles]

The invention provides spherical porous silicone rubber particles having pores in the interior or on the surface thereof. Pores are present in the interior or on the surface of each particle, that is, pores may be present in the interior or on the surface of each particle, or in the interior and on the surface of each particle. The number of pores is at least one, preferably at least two per spherical porous silicone rubber particle. The shape of pores may be spherical, semispherical or irregular, preferably spherical or semispherical, more preferably spherical in the interior and semispherical on the surface.

As to the shape of spherical porous silicone rubber particles, the surface structure can be determined by observation under an electron microscope. The interior structure of spherical porous silicone rubber particles can be determined by sectioning a particle and observing the cross section under an electron or optical microscope.

The spherical porous silicone rubber particles should preferably have a volume average particle size (MV) of 0.5 to 100 μm, more preferably 1 to 20 μm. A volume average particle size in the range ensures that spherical porous silicone rubber particles are less agglomerative, readily disperse to primary particles, and give improved dry feel. A volume average particle size of up to 100 μm leads to improvements in dry and smooth feels and eliminates gritty feel. It is noted that the volume average particle size is measured, depending on the diameter of resulting spherical porous silicone rubber particles, by the electric resistance method when the diameter is at least 1 μm and by the laser diffraction/scattering method when the diameter is less than 1 μm.

The spherical or semispherical pores preferably have a diameter of 0.2 to 30 μm, more preferably 0.2 to 10 μm. When the pore diameter is 0.2 μm or more, a W/O type emulsion is readily prepared and the development of light scattering performance is more expectable. When the pore diameter is 30 μm or less, at least two pores can be readily formed within each spherical porous silicone rubber particle. The diameter of pores is measured by observing a cross section of a particle under an electron or optical microscope.

The silicone rubber of which the spherical porous silicone rubber particles are made is preferably free of stickiness. Its rubber hardness is preferably in a range of 5 to 90, more preferably in a range of 10 to 80, as measured by Type A Durometer according to JIS K 6253. A rubber hardness in the range ensures that spherical porous silicone rubber particles are less agglomerative, readily disperse to primary particles, and give improved dry feel. When the hardness is 90 or less, spherical porous silicone rubber particles give improved soft feel.

The silicone rubber of which the spherical porous silicone rubber particles are made is preferably a cured product comprising linear organosiloxane blocks having the average compositional formula: $(R^1{}_2SiO_{2/2})_n$. Herein $R^1$ is a substituted or unsubstituted $C_1$-$C_{30}$ monovalent hydrocarbon group and n is a positive integer of 5 to 5,000.

Examples of $R^1$ include alkyl groups such as methyl, ethyl, propyl, butyl, pentyl, hexyl, heptyl, octyl, decyl, undecyl, dodecyl, tetradecyl, pentadecyl, hexadecyl, heptadecyl, octadecyl, nonadecyl, icosyl, henicosyl, docosyl, tricosyl, and tetrasyl; aryl groups such as phenyl, tolyl and naphthyl; aralkyl groups such as benzyl and phenethyl; alkenyl groups such as vinyl and allyl; cycloalkyl groups such as cyclopentyl, cyclohexyl and cycloheptyl; and substituted forms of the foregoing hydrocarbon groups in which some or all of the carbon-bonded hydrogen atoms are substituted by such atoms as halogen atoms (fluorine, chlorine, bromine, iodine) and/or such substituents as acryloxy, methacryloxy, epoxy, glycidoxy and carboxyl.

The silicone rubber is obtained by curing a curable liquid silicone composition and has a crosslinked structure, i.e., three-dimensional network structure. The method of producing spherical porous silicone rubber particles by curing a curable liquid silicone composition may accord with any prior art well-known methods. One exemplary method is by effecting addition reaction between an organo(poly)siloxane having a silicon-bonded monovalent aliphatic unsaturated group such as vinylsilyl group ($\equiv$SiCH=CH$_2$) and an organohydrogen(poly)siloxane having a silicon-bonded hydrogen atom, i.e., hydrosilyl group ($\equiv$Si—H or SiH group) in the presence of a platinum group metal based catalyst. Specifically, the silicone rubber is preferably the addition reaction product of an organo(poly)siloxane having at least two silicon-bonded monovalent aliphatic unsaturated groups per molecule with an organohydrogen(poly)siloxane having at least two silicon-bonded hydrogen atoms per molecule, with the proviso that the monovalent aliphatic unsaturated groups and/or the hydrogen atoms are present at least three per molecule.

Exemplary combinations of the organo(poly)siloxane with the organohydrogen(poly)siloxane are given below. In these combinations, the organo(poly)siloxane and the organohydrogen(poly)siloxane are blended in such ratios that 0.5 to 2.0 Si—H groups are available per monovalent aliphatic unsaturated group.

- a combination of an organo(poly)siloxane having at least two monovalent aliphatic unsaturated groups per molecule, represented by the formula: $R^2_aR^3_bSiO_{(4-a-b)/2}$ with an organohydrogen(poly)siloxane having at least three silicon-bonded hydrogen atoms per molecule, represented by the average compositional formula: $R^4_cH_dSiO_{(4-c-d)/2}$
- a combination of an organo(poly)siloxane having at least three monovalent aliphatic unsaturated groups per molecule, represented by the formula: $R^2_aR^3_bSiO_{(4-a-b)/2}$ with an organohydrogen(poly)siloxane having at least two silicon-bonded hydrogen atoms per molecule, represented by the average compositional formula: $R^4_cH_dSiO_{(4-c-a-d)/2}$ In the above formulae, $R^2$ is a substituted or unsubstituted $C_1$-$C_{30}$ monovalent hydrocarbon group exclusive of aliphatic unsaturated group, and $R^3$ is a $C_2$-$C_6$ monovalent aliphatic unsaturated group. The subscripts a and b are positive numbers satisfying $0<a<3$, $0<b\leq3$, and $0.1\leq a+b\leq3$, preferably positive numbers satisfying $0<a\leq2.295$, $0.005\leq b\leq2.3$, and $0.5\leq a+b\leq2.3$. $R^4$ is a substituted or unsubstituted $C_1$-$C_{30}$ monovalent hydrocarbon group exclusive of aliphatic unsaturated group. The subscripts c and d are positive numbers satisfying $0<c<3$, $0<d<3$, and $0.1\leq c+d\leq3$, preferably positive numbers satisfying $0<c\leq2.295$, $0.005\leq d\leq2.3$, and $0.5\leq c+d\leq2.3$.

Examples of $R^2$ include alkyl groups such as methyl, ethyl, propyl, butyl, pentyl, hexyl, heptyl, octyl, decyl, undecyl, dodecyl, tetradecyl, pentadecyl, hexadecyl, heptadecyl, octadecyl, nonadecyl, icosyl, henicosyl, docosyl, tricosyl, and tetrasyl; aryl groups such as phenyl, tolyl and naphthyl; aralkyl groups such as benzyl and phenethyl; alkenyl groups such as vinyl and allyl; cycloalkyl groups such as cyclopentyl, cyclohexyl and cycloheptyl; and substituted forms of the foregoing hydrocarbon groups in which some or all of the carbon-bonded hydrogen atoms are substituted by such atoms as halogen atoms (fluorine, chlorine, bromine, iodine) and/or such substituents as acryloxy, methacryloxy, epoxy, glycidoxy and carboxyl. It is preferred from the industrial aspect that at least 50 mol % of all groups $R^2$ be vinyl.

Examples of $R^3$ include vinyl, allyl, propenyl, butenyl, pentenyl, and hexenyl, with vinyl being preferred from the industrial aspect.

Examples of $R^4$ include such functional groups as exemplified above for $R^2$.

Also, the organo(poly)siloxane and the organohydrogen(poly)siloxane should preferably have a kinematic viscosity at 25° C. of up to 100,000 mm$^2$/s, more preferably up to 10,000 mm$^2$/s. If the kinematic viscosity exceeds the upper limit, it may become difficult to obtain particles having a narrow particle size distribution by the inventive preparation method to be described later. The lower limit of kinematic viscosity is preferably at least 1 mm$^2$/s though not critical. It is noted that the kinematic viscosity is measured at 25° C. by an Ostwald viscometer. The structure of the organo(poly)siloxane and the organohydrogen(poly)siloxane may be linear, cyclic or branched, with the linear structure being preferred.

Examples of the organo(poly)siloxane are shown below, but not limited thereto. In the following formulae, Me stands for methyl and Vi for vinyl. The order of arrangement of siloxane units within parentheses is not limited to the illustration.

[Chem. 1]

$(0\leq n1\leq 1,000)$

[Chem. 2]

$(0\leq n2\leq 1,000)$

[Chem. 3]

$(0\leq n3\leq 1,000, 2\leq n4\leq 100)$

[Chem. 4]

(0≤n5≤1,000, 1≤n6≤100)

Examples of the organohydrogen(poly)siloxane are shown below, but not limited thereto. In the following formulae, Me stands for methyl. The order of arrangement of siloxane units within parentheses is not limited to the illustration.

[Chem. 5]

(2≤n7≤1,000)

[Chem. 6]

(2≤n8≤1,000, 1≤n9≤500)

[Chem. 7]

(0≤n10≤1,000, 1≤n11≤500)

The platinum group metal-based catalyst may be any of well-known catalysts used in hydrosilylation reaction. Examples include platinum group metals alone such as platinum (inclusive of platinum black), rhodium and palladium; platinum chloride, chloroplatinic acid and chloroplatinic acid salts such as $H_2PtCl_4·kH_2O$, $H_2PtCl_6·kH_2O$, $NaHPtCl_6·kH_2O$, $KHPtCl_6·kH_2O$, $Na_2PtCl_6·kH_2O$, $K_2PtCl_4·kH_2O$, $PtCl_4·kH_2O$, $PtCl_2$ and $Na_2HPtCl_4·kH_2O$ wherein k is an integer of 0 to 6, preferably 0 or 6; alcohol-modified chloroplatinic acid (see U.S. Pat. No. 3,220,972); complexes of chloroplatinic acid with olefins (see U.S. Pat. Nos. 3,159,601, 3,159,662 and 3,775,452); platinum group metals such as platinum black and palladium on carriers such as alumina, silica and carbon; rhodium-olefin complexes; chlorotris(triphenylphosphine)rhodium (known as Wilkinson catalyst); and complexes of platinum, platinum chloride, chloroplatinic acid or chloroplatinic acid salts with vinyl-containing siloxanes, especially platinum with vinyl-containing disiloxanes or vinyl-containing cyclic siloxanes.

The amount of the platinum group metal-based catalyst used may be a sufficient amount to promote hydrosilylation reaction. If the amount of the catalyst added is excessive, the polyether moiety of a surfactant to be described later can be oxidized to give off a smell. Specifically, the amount of the catalyst added is to provide preferably 0.1 to 100 ppm (by weight), more preferably 0.5 to 50 ppm, and even more preferably 1 to 30 ppm of platinum group metal based on the total weight of the organo(poly)siloxane and the organohydrogen(poly)siloxane.

The spherical porous silicone rubber particles of the invention may contain silicone oil, inorganic powder, organic powder or the like within them.

[Porous Silicone Composite Particles]

The invention also provides porous silicone composite particles comprising the above-defined spherical porous silicone rubber particles having spherical polyorganosilsesquioxane deposited on or anchored to the surface thereof. The polyorganosilsesquioxane may be sparsely or densely deposited on the surface of each spherical porous silicone rubber particle. With a higher deposition density, dimpled particles are more readily obtained. The porous silicone composite particles are spherical while the shape of polyorganosilsesquioxane is preferably substantially spherical (true sphere) or semispherical. The spherical polyorganosilsesquioxane preferably has a particle diameter of 10 to 400 nm, more preferably 10 to 200 nm. If the grain diameter of polyorganosilsesquioxane is less than 10 nm, the resulting porous silicone composite particles may be degraded in light scattering performance. If the grain diameter is more than 400 nm, the resulting porous silicone composite particles may be less effective to give soft touch and be degraded in light scattering performance. It is noted that the diameter of the polyorganosilsesquioxane should preferably be smaller than the diameter of the spherical porous silicone rubber particles.

The diameter and shape of the polyorganosilsesquioxane and the deposition density thereof on the spherical porous silicone rubber particle surface can be determined by observing the spherical porous silicone rubber particles under an electron microscope.

The polyorganosilsesquioxane is, for example, a resinous solid product in which units having the formula: $R^5SiO_{3/2}$ are crosslinked in 3D network. Herein $R^5$ is a substituted or unsubstituted $C_1-C_{20}$ monovalent hydrocarbon group. Examples of $R^5$ include alkyl groups such as methyl, ethyl, propyl, butyl, pentyl, hexyl, heptyl, octyl, decyl, undecyl, dodecyl, tetradecyl, pentadecyl, hexadecyl, heptadecyl, octadecyl, nonadecyl, icosyl, henicosyl, docosyl, tricosyl, and tetrasyl; aryl groups such as phenyl, tolyl and naphthyl; aralkyl groups such as benzyl and phenethyl; alkenyl groups such as vinyl and allyl; cycloalkyl groups such as cyclopentyl, cyclohexyl and cycloheptyl; and substituted forms of the foregoing hydrocarbon groups in which some or all of the carbon-bonded hydrogen atoms are substituted by such atoms as halogen atoms (fluorine, chlorine, bromine, iodine) and/or such substituents as acryloxy, methacryloxy, epoxy, glycidoxy and carboxyl.

In order that the inventive preparation method (to be described later) works to deposit the polyorganosilsesquioxane on the surface of spherical porous silicone rubber particles, it is preferred that at least 50 mol %, more preferably at least 80 mol %, even more preferably at least 90 mol % of groups $R^5$ be methyl, vinyl or phenyl.

The amount of polyorganosilsesquioxane deposited on the spherical porous silicone rubber particle surface is preferably 1 to 25 parts by weight, more preferably 2 to 25 parts by weight per 100 parts by weight of the spherical porous silicone rubber particles. An amount of polyorganosilsesquioxane in the range ensures that the resulting spherical silicone composite particles are more improved in light scattering performance and dry feel, and the likelihood that porous silicone composite particles having concave and convex portions on their surface are obtained by the inventive preparation method (to be described later). If the amount of polyorganosilsesquioxane exceeds the upper limit, the porous silicone composite particles may be less effective to give soft touch.

The polyorganosilsesquioxane may contain units of at least one type selected from $R^5{}_2SiO_{2/2}$ units, $R^5{}_3SiO_{1/2}$ units and $SiO_{4/2}$ units as well as $R^5SiO_{3/2}$ units insofar as the resulting porous silicone composite particles do not lose non-agglomerative and dispersing properties, feels on use such as dry and smooth feels, and soft touch. In such polyorganosilsesquioxane, the content of $R^5SiO_{3/2}$ units is preferably 70 to 100 mol %, more preferably 80 to 100 mol % of the overall siloxane units.

The porous silicone composite particles should preferably have a volume average particle size of 0.5 to 100 μm, more preferably 1 to 20 μm. The porous silicone composite particles should preferably have a diameter of 0.2 to 30 μm, more preferably 0.2 to 10 μm. The measurement technique and the reason are the same as described for the spherical porous silicone rubber particles.

[Method of Preparing Spherical Porous Silicone Rubber Particles]

The spherical porous silicone rubber particles of the invention may be prepared, for example, by a method comprising the following steps of:

(i) obtaining a W/O (inner water phase/oil phase) type emulsion consisting of an inner water phase component and an oil phase component composed of a curable liquid silicone composition, (ii) obtaining a W/O/W (inner water phase/oil phase/outer water phase) type emulsion consisting of the W/O type emulsion obtained in step (i) and an outer water phase component, (iii) curing the curable liquid silicone composition constituting the oil phase in the W/O/W type emulsion obtained in step (ii) in the presence of a catalyst, for yielding a water dispersion of spherical porous silicone rubber particles, and (iv) removing water in the outer phase and water in the spherical porous silicone rubber particles from the water dispersion of spherical porous silicone rubber particles obtained in step (iii).

Step (i) of Obtaining a W/O (Inner Water Phase/Oil Phase) Type Emulsion Consisting of an Inner Water Phase Component and an Oil Phase Component Composed of a Curable Liquid Silicone Composition The W/O type emulsion may be prepared by any well-known techniques. Most often, it is prepared by dispersing a water phase component in an oil phase component, followed by emulsification.

The inner water phase component may contain various water-soluble active ingredients which are not particularly limited. For example, the inner water phase component contains water (pure water) which is commonly used as one component of cosmetics, and a solution or dispersion which is obtained by mixing water and additives. The additives may be selected as appropriate depending on the intended use of the spherical porous silicone rubber particles. When the particles are used in cosmetics, suitable active ingredients include, for example, humectants, softening agents, perfuming agents, UV absorbers, thickeners, preservatives, fungicides, alcohols, water-soluble salts, and various dyes.

While the inner water phase component which is one of constitutional components of the invention serves to control the concentration of the resulting W/O type emulsion and the pore size in the spherical porous silicone rubber particles, it is preferably blended in an amount of 10 to 90 parts by weight, more preferably 30 to 70 parts by weight per 100 parts by weight of the W/O type emulsion. If the blend amount is less than 10 parts by weight, there are possibilities that the resulting W/O type emulsion contains a very small amount of liquid droplets and that the pore forming rate of spherical porous silicone rubber particles resulting from the subsequent steps is drastically reduced. If the blend amount is more than 90 parts by weight, there is a possibility that the resulting W/O type emulsion has so high a viscosity as to interfere with the emulsifying performance of the next step (ii).

The oil phase component is a dispersing medium to the inner water phase component of the resulting W/O type emulsion and corresponds to the rubber component in the spherical porous silicone rubber particles. The oil phase component is composed of a curable liquid silicone composition, for example, a curable liquid silicone composition comprising an organo(poly)siloxane having silicon-bonded monovalent aliphatic unsaturated groups such as vinylsilyl (≡SiCH=CH$_2$) groups and an organohydrogen(poly)siloxane having silicon-bonded hydrogen atoms, i.e., hydrosilyl (≡Si—H or Si—H) groups, with the proviso that the monovalent aliphatic unsaturated groups and/or the hydrogen atoms are present at least three per molecule.

Examples, preferred ranges, and kinematic viscosity at 25° C. of the organo(poly)siloxane and the organohydrogen(poly)siloxane, and the ratio of the organo(poly)siloxane to the organohydrogen(poly)siloxane are the same as described above for the "spherical porous silicone rubber particles."

In step (i), a surfactant is preferably used as the emulsifier to emulsify the inner water phase component in the oil phase component to form a W/O type emulsion. The surfactant used herein is not particularly limited and examples thereof include nonionic, anionic, cationic and ampholytic surfactants, which may be used alone or in any suitable combination.

Examples of the nonionic surfactant include polyoxyethylene alkyl ethers, polyoxyethylene polyoxypropylene alkyl ethers, polyoxyethylene alkyl phenyl ethers, polyethylene glycol fatty acid esters, sorbitan fatty acid esters, polyoxyethylene sorbitan fatty acid esters, polyoxyethylene sorbitol fatty acid esters, glycerol fatty acid esters, polyoxyethylene glycerol fatty acid esters, polyglycerol fatty acid esters, propylene glycol fatty acid esters, polyoxyethylene castor oil, polyoxyethylene hydrogenated castor oil, polyoxyethylene hydrogenated castor oil fatty acid esters, polyoxyethylene alkyl amines, polyoxyethylene fatty acid amides, and silicone-based surfactants.

Suitable silicone-based surfactants include polyether-modified silicones such as polyoxyethylene-modified organopolysiloxane, polyoxypropylene-modified organopolysiloxane, and polyoxyethylene polyoxypropylene-modified organopolysiloxane, polyglycerol-modified silicones, polyether/alkyl-co-modified silicones, polyglycerol/alkyl-co-modified silicones, polyether/silicone/alkyl-co-modified silicones, and polyglycerol/silicone/alkyl-co-modified silicones. These silicones encompass linear, branched and crosslinked types.

Examples of the anionic surfactant include sulfuric ester salts such as alkyl sulfate salts, polyoxyethylene alkyl ether sulfate salts, polyoxyethylene alkyl phenyl ether sulfate salts, and fatty acid alkylol amides, alkylbenzene sulfonates, polyoxyethylene alkyl phenyl ether sulfonates, α-olefin sulfonates, α-sulfofatty acid ester salts, alkylnaphthalene sulfonic acid, alkyl diphenyl ether disulfonates, alkane sulfonates, N-acyltaurates, dialkylsulfosuccinates, monoalkylsulfosuccinates, polyoxyethylene alkyl ether sulfosuccinates, fatty acid salts, polyoxyethylene alkyl ether carboxylates, N-acylamino acid salts, monoalkylphosphates, dialkylphosphates, polyoxyethylene alkyl ether phosphates.

Examples of the cationic surfactant include alkyltrimethylammonium salts, dialkyldimethylammonium salts, polyoxyethylene alkyldimethylammonium salts, dipolyoxyethylene alkylmethylammonium salts, tripolyoxyethylene alkylammonium salts, alkyl benzyl dimethylammonium salts, alkyl pyridinium salts, monoalkylamine salts, and monoalkylamide amine salts.

Examples of the ampholytic surfactant include alkyl dimethyl amine oxides, alkyl dimethyl carboxybetaines, alkyl amide propyl dimethylcarboxybetaines, alkyl hydroxysulfobetaines, and alkyl carboxymethyl hydroxyethyl imidazolium betaines.

These surfactants preferably have a HLB value of up to 10, more preferably up to 8. Among these, nonionic surfactants are preferred in that a fine emulsion can be obtained by emulsifying the liquid silicone composition with a small amount of the surfactant.

The amount of the surfactant used is preferably in a range of 0.01 to 20 parts by weight, more preferably 0.05 to 5 parts by weight per 100 parts by weight of the curable liquid silicone composition. If the amount of the surfactant used is less than 0.01 part by weight, it may become difficult to obtain a fine emulsion. An amount in excess of 20 parts by weight can invite an economic disadvantage because the proportion of the surfactant which is dissolved in the oil phase not contributing to emulsification increases.

Emulsification may be performed on ordinary emulsifying/dispersing machines. Examples include high-speed rotation centrifugal radial agitators such as homogenizing dispersers, high-speed rotation shear agitators such as homogenizing mixers, high-pressure jet emulsifying/dispersing machines such as Homogenizer, colloid mills, and ultrasonic emulsifiers.

As viewed from the ease of emulsification in the following step (ii), the W/O type emulsion obtained in step (i) may be diluted with a curable liquid silicone such as organo(poly)siloxane or organohydrogen(poly)siloxane, depending on the viscosity of the emulsion.

Step (ii) of Obtaining a W/O/W (Inner Water Phase/Oil Phase/Outer Water Phase) Type Emulsion Consisting of the W/O Type Emulsion Obtained in Step (i) and an Outer Water Phase Component The W/O/W type emulsion may be prepared by any well-known techniques. Most often, it is prepared by dispersing the W/O type emulsion obtained in step (i) in an outer water phase component, followed by emulsification.

The outer water phase component may contain various water-soluble active ingredients as exemplified above in conjunction with step (i). The outer water phase component may further contain water-soluble high-molecular weight compounds such as thickeners.

The water-soluble high-molecular weight compounds are not particularly limited and any well-known water-soluble high-molecular weight compounds may be used. Examples include naturally occurring water-soluble high-molecular weight compounds, semi-synthetic water-soluble high-molecular weight compounds, and synthetic water-soluble high-molecular weight compounds.

Examples of the naturally occurring water-soluble high-molecular weight compound include plant base polymers such as gum arabic, guar gum, carrageenan, pectin, agar, quince seed, starch (rice, corn, potato, wheat), and glycyrrhizinic acid; microorganism base high-molecular weight compounds such as xanthan gum, dextran and pullulan; and animal base high-molecular weight compounds such as collagen, casein, albumin, and gelatin.

Examples of the semi-synthetic water-soluble high-molecular weight compound include starch base high-molecular weight compounds such as carboxymethyl starch and methylhydroxypropyl starch; cellulose base high-molecular weight compounds such as methyl cellulose, nitrocellulose, ethyl cellulose, hydroxyethyl cellulose, hydroxypropyl cellulose, sodium carboxymethyl cellulose (CMC), crystalline cellulose and cellulose powder; and alginic acid base high-molecular weight compounds such as sodium alginate and propylene glycol alginate.

Examples of the synthetic water-soluble high-molecular weight compound include vinyl polymers such as polyvinyl alcohol, polyvinyl methyl ether, carboxyvinyl polymers; polyoxyethylene polymers such as polyethylene glycol (molecular weight 1500, 4000, 6000); copolymers such as polyoxyethylene polyoxypropylene copolymers; acrylic polymers such as sodium polyacrylate, polyacrylamide, acrylic acid-alkyl methacrylate copolymers; polyethylene imine and cationic polymers.

When the water-soluble high-molecular weight compound is used, its amount is preferably 0.01 to 50% by weight, more preferably 0.1 to 20% by weight, even more preferably 0.3 to 10% by weight based on the W/O/W type emulsion obtained in the relevant step.

In step (ii), a surfactant is preferably used as the emulsifier to emulsify the W/O type emulsion of step (i) in an outer water phase component to form a W/O/W type emulsion. The surfactant used herein is as exemplified above in conjunction with step (i) and such surfactants may be used alone or in any suitable combination. Preferred are those surfactants having a HLB value of at least 8, more preferably at least 10. It is recommended to use in step (ii) a surfactant having a higher HLB value than the HLB value of the surfactant used in step (i). In particular, nonionic surfactants are preferred in that a fine emulsion can be obtained by emulsifying the liquid silicone composition with a small amount of the surfactant. Inter alia, polyoxyethylene surfactants, especially polyoxyethylene sorbitan monooleate (POE sorbitan monooleate) are preferred because they contribute to the stability of W/O/W type emulsion.

The amount of the surfactant used is preferably in a range of 0.01 to 10 parts by weight, more preferably 0.05 to 5 parts by weight per 100 parts by weight of the W/O type emulsion. If the amount of the surfactant used exceeds 10 parts by weight, there are possibilities that an O/W type emulsion forms due to phase reversal rather than the W/O/W type emulsion, and that when polyorganosilsesquioxane is deposited onto the surface of spherical porous silicone rubber particles by the inventive preparation method, such deposition is hampered. If the amount of the surfactant used is less than 0.01 part by weight, it may become difficult to obtain a stable W/O/W type emulsion.

Emulsification may be performed on ordinary emulsifying/dispersing machines. Examples include high-speed rotation centrifugal radial agitators such as homogenizing dispersers, high-speed rotation shear agitators such as homogenizing mixers, high-pressure jet emulsifying/dispersing machines such as Homogenizer, and colloid mills.

Preferably, the shear force developed by the emulsifying/dispersing machine is lower than that in step (i). If the shear force is higher than that in step (i), there is a possibility that an O/W type emulsion forms due to phase reversal rather than the W/O/W type emulsion.

Step (iii) of Curing the Curable Liquid Silicone Composition Constituting the Oil Phase in the W/O/W Type Emulsion Obtained in Step (ii) in the Presence of a Catalyst, for Yielding a Water Dispersion of Spherical Porous Silicone Rubber Particles A water dispersion of spherical porous silicone rubber particles may be prepared by adding a catalyst to the emulsion obtained from steps (i) and (ii) to invoke curing reaction.

The catalyst used herein may be a platinum group metal base catalyst as described in the "spherical porous silicone rubber particles" section when the curable liquid silicone composition is of addition cure type, for example. If the catalyst is less dispersible in water, the catalyst is preferably dispersed or dissolved in a surfactant before it is added to the emulsion. Although the curing reaction may take place at room temperature, the reaction may be performed at an elevated temperature below 100° C. if the reaction does not fully proceed to completion at room temperature.

The catalyst may be previously added to the curable liquid silicone composition. In this case, it is recommended to perform emulsification while controlling the temperature of the curable liquid silicone composition and the time so that the curable liquid silicone composition may not cure prior to the end of steps (i) and (ii). Further, a reaction inhibitor may be previously added to the curable liquid silicone composition in order to control the reactivity of the catalyst.

Step (iv) of Removing Water in the Outer Phase and Water in the Spherical Porous Silicone Rubber Particles from the Water Dispersion of Spherical Porous Silicone Rubber Particles Obtained in Step (iii)

The technique of removing water may be by heating the water dispersion under atmospheric or reduced pressure. Suitable water removal techniques include a technique of holding the dispersion static at elevated temperature, a technique of agitating and fluidizing the dispersion at elevated temperature, a technique of spraying and dispersing the dispersion into hot air stream through a spray dryer or the like, and a technique of utilizing a flowing hot medium.

Water may be removed from the water dispersion while the dispersion is kept as such, or if necessary, after the dispersion is concentrated or washed with water or water-soluble alcohol. Also the water dispersion may be diluted by further adding water. The dispersion preferably contains the spherical porous silicone rubber particles in an amount of 1 to 150 parts by weight, more preferably 5 to 70 parts by weight per 100 parts by weight of water. If the proportion of the spherical porous silicone rubber particles in the dispersion is less than 1 part by weight, there is a possibility that the desired porous silicone composite particles are produced at a low efficiency. If the proportion exceeds 150 parts by weight, there is a possibility that when polyorganosilsesquioxane is deposited onto the surface of spherical porous silicone rubber particles, such deposition is hampered, and the particles agglomerate and fuse together.

Also, a surfactant or water-soluble high-molecular weight compound may be added to the water dispersion for the purposes of controlling the adhesion of polyorganosilsesquioxane to be deposited onto the surface of spherical porous silicone rubber particles and the size of the resulting polyorganosilsesquioxane grains.

The surfactant which is added to the water dispersion of spherical porous silicone rubber particles is not particularly limited and any suitable one of the aforementioned surfactants may be used. The surfactant to be added may be identical with or different from the surfactant which has been contained in the water dispersion of spherical porous silicone rubber particles while two or more surfactants may be additionally added.

The water-soluble high-molecular weight compound which is added to the water dispersion of spherical porous silicone rubber particles is not particularly limited, and examples thereof include nonionic, anionic, cationic and ampholytic water-soluble high-molecular weight compounds, which may be used alone or in admixture of two or more.

Examples of the nonionic water-soluble high-molecular weight compound include vinyl alcohol-vinyl acetate copolymers, acrylamide copolymers, vinyl pyrrolidone polymers, vinyl pyrrolidone-vinyl acetate copolymers, polyethylene glycol, isopropyl acrylamide polymers, methyl vinyl ether polymers, starch, methyl cellulose, hydroxyethyl cellulose, hydroxypropyl cellulose, guar gum, and xanthan gum.

Examples of the anionic water-soluble high-molecular weight compound include sodium acrylate polymers, sodium acrylate-sodium maleate copolymers, sodium acrylate-acrylamide copolymers, sodium styrenesulfonate polymers, sodium polyisoprenesulfonate-styrene copolymers, sodium naphthalenesulfonate polymers, carboxymethyl starch, starch phosphate, carboxymethyl cellulose, sodium alginate, gum arabic, carrageenan, sodium chondroitin sulfate, and sodium hyaluronate.

Examples of the cationic water-soluble high-molecular weight compound include dimethyldiallylammonium chloride polymers, vinyl imidazoline polymers, methylvinylimidazolium chloride polymers, (acryloyloxyethyl)trimethylammonium chloride polymers, (methacryloyloxyethyl)trimethylammonium chloride polymers, (acrylamidopropyl)trimethylammonium chloride polymers, (methacrylamidopropyl)trimethylammonium chloride polymers, epichlorohydrin-dimethylamine copolymers, poly(ethylene imine), quaternary poly(ethylene imine), allylamine hydrochloride polymers, polylysine, cationic starch, cationic cellulose, chitosan, and derivatives of the foregoing having a monomer containing a nonionic or anionic group copolymerized therewith.

Examples of the ampholytic water-soluble high-molecular weight compound include (acryloyloxyethyl)trimethylammonium chloride/acrylic acid/acrylamide copolymers, (methacryloyloxyethyl)trimethylammonium chloride/acrylic acid/acrylamide copolymers, and Hoffman degradation products of acrylamide polymers.

[Method for Preparing Porous Silicone Composite Particles]

A method for preparing the porous silicone composite particles involves the deposition step of subjecting an organotrialkoxysilane to hydrolysis and condensation reactions in the presence of spherical porous silicone rubber particles, water, and an alkaline substance, for thereby depositing polyorganosilsesquioxane onto the surface of the spherical porous silicone rubber particles. Specifically, the method involves the step of adding an alkaline substance and an organotrialkoxysilane to the water dispersion obtained from the foregoing step (iii), for thereby subjecting the organotrialkoxysilane to hydrolysis and condensation reactions. At the end of this step, there are obtained porous silicone composite particles having spherical polyorganosilsesquioxane deposited on the surface of spherical porous silicone rubber particles.

The alkaline substance acts as a catalyst for subjecting the organotrialkoxysilane to hydrolysis and condensation reactions or condensation reaction. The alkaline substance may be used alone or in admixture. The alkaline substance may be added as such or as an alkaline aqueous solution and may be added to the water dispersion obtained from step (iii) either before or after the step (iii') of adding organotrialkoxysilane.

The alkaline substance is not particularly limited and any alkaline substance may be used as long as it promotes the hydrolysis and condensation reactions of organotrialkoxysilane. Examples include alkali metal hydroxides such as potassium hydroxide, sodium hydroxide and lithium hydroxide; alkaline earth metal hydroxides such as calcium hydroxide and barium hydroxide; alkali metal carbonates such as potassium carbonate and sodium carbonate; ammonia; tetraalkylammonium hydroxides such as tetramethylammonium hydroxide and tetraethylammonium hydroxide; and amines such as monomethylamine, monoethylamine, monopropylamine, monobutylamine, monopentylamine, dimethylamine, diethylamine, trimethylamine, triethanolamine, and ethylene diamine. Inter alia, ammonia is most preferred because it can be readily removed from the resulting porous silicone composite particles by volatilization. Any commercially available ammonia water may be used as ammonia.

The alkaline substance is preferably added in such amounts that the water dispersion of spherical porous silicone rubber particles may have a pH value in the range of 9.0 to 13.0, more preferably 9.5 to 12.5. As long as the pH value is in the range, the hydrolysis and condensation reactions of organotrialkoxysilane take place to a full extent and the resulting polyorganosilsesquioxane readily deposits on the surface of spherical porous silicone rubber particles.

The organotrialkoxysilane is represented, for example, by the formula: $R^5Si(OR^6)_3$ wherein $R^5$ is as defined above and $R^6$ is an unsubstituted $C_1$-$C_6$ monovalent hydrocarbon group. Examples of $R^6$ include methyl, ethyl, propyl, butyl, pentyl and hexyl, with methyl being preferred in view of reactivity. When one or more of $R^5_2SiO_2Si_{2/2}$ units, $R^5_3SiO_{1/2}$ units and $SiO_{4/2}$ units are introduced into the polyorganosilsesquioxane, any corresponding one or more of $R^5_2Si(OR^6)_2$, $R^5_3SiOR^6$, and $Si(OR^6)_4$ may be added wherein $R^5$ and $R^6$ are as defined above. When $R^5Si(OR^6)_3$ and at least one selected from $R^5_2Si(OR^6)_2$, $R^5_3SiOR^6$ and $Si(OR^6)_4$ are used as the starting reactants to the polyorganosilsesquioxane, for example, preferably $R^5Si(OR^6)_3$ accounts for 70 to 100 mol %, more preferably 80 to 100 mol % of the total reactants.

The organotrialkoxysilane is preferably added in such amounts that the polyorganosilsesquioxane is present in an amount of 1 to 50 parts by weight, more preferably 2 to 25 parts by weight per 100 parts by weight of the spherical porous silicone rubber particles.

The organotrialkoxysilane is preferably added to the dispersion which is stirred by a standard agitator such as propeller or paddle agitator. Stirring is continued from the addition of organotrialkoxysilane until the completion of hydrolysis and condensation reactions of the alkoxysilane.

In one embodiment wherein the organotrialkoxysilane is added after the alkaline substance is added to the water dispersion of spherical porous silicone rubber particles, the organotrialkoxysilane may be added all at once, but preferably gradually over time. During addition, the reaction solution is preferably at a temperature of 0 to 60° C., more preferably 0 to 40° C. As long as the temperature is in the range, polyorganosilsesquioxane effectively deposits on the surface of spherical porous silicone rubber particles. To drive the hydrolysis and condensation reactions to completion, the hydrolysis and condensation reactions may be performed at room temperature or at an elevated temperature of about 40° C. to about 100° C., and/or an additional amount of the alkaline substance may be supplemented.

In the preparation method of the invention, the organotrialkoxysilane may be added prior to the addition of the alkaline substance. In this embodiment, the organotrialkoxysilane may be first added to water to form an organotrialkoxysilane aqueous solution. The organotrialkoxysilane may be added to water all at once or gradually added over time. Also, water may be added to the organotrialkoxysilane, or water and the organotrialkoxysilane may be simultaneously fed to the reaction system and mixed therein. The temperature at which the organotrialkoxysilane is added to water is not particularly limited, and for example, falls in the range of 0 to 100° C. Thereafter, hydrolytic reaction of the organotrialkoxysilane takes place, and stirring is continued at least until the organotrialkoxysilane is dissolved in water. At this point, a small amount of acid may be added in order to promote the hydrolytic reaction.

To the resulting organotrialkoxysilane aqueous solution, the water dispersion of spherical porous silicone rubber particles is added and then the alkaline substance added. Once the alkaline substance is added, the organotrialkoxysilane hydrolyzate undergoes condensation reaction to produce polyorganosilsesquioxane. Notably it is necessary that stirring be interrupted or remarkably slowed down before the polyorganosilsesquioxane is produced. If the reaction solution flows at a high velocity during formation of polyorganosilsesquioxane, there is a likelihood that the polyorganosilsesquioxane does not effectively deposit on the surface of spherical porous silicone rubber particles.

The temperature during condensation reaction is preferably in the range of 0 to 60° C., more preferably 0 to 40° C. As long as the temperature is in the range, the polyorganosilsesquioxane effectively deposits on the surface of spherical porous silicone rubber particles. It is recommended that the reaction solution is kept under static or remarkably slow stirred conditions until the polyorganosilsesquioxane is formed (or the polyorganosilsesquioxane deposits on the surface of spherical porous silicone rubber particles). The static standing time is preferably in the range of 10 minutes to 24 hours. Thereafter, an additional amount of the alkaline substance may be supplemented or the system may be heated at 40 to 100° C. in order to drive the condensation reaction to completion.

This is followed by the step (iv) of removing water in the outer phase and water in the spherical porous silicone rubber particles from the water dispersion after the hydrolysis and condensation reactions. The illustrative procedure of this step is the same as described for the above step (iv).

It is noted that if a powder form of porous silicone composite particles obtained from volatilization or evaporation of water is agglomerated or fused, it may be disintegrated by such a grinder as jet mill, ball mill or hammer mill.

EXAMPLES

Examples are given below for further illustrating the invention although the invention is not limited thereto. In Examples, the viscosity is a kinematic viscosity measured at 25° C. by an Ostwald viscometer, and the percent (%) concentration and content are by weight.

Example 1

Preparation of Water Dispersion of Spherical Porous Silicone Rubber Particles Using Polyether-Modified (Linear) Silicone A disposable cup of 500 mL volume was charged with 31 g of methylvinylpolysiloxane having a kinematic viscosity of 8.4 mm$^2$/s and represented by the formula (1):

[Chem. 8]

(1)

17 g (an amount to provide 1.13 hydrosilyl groups per aliphatic unsaturated group) of methylhydrogenpolysiloxane having a kinematic viscosity of 28 mm$^2$/s and represented by the formula (2):

[Chem. 9]

(2)

10 g of linear polyether-modified silicone: PEG-3.6 propyl ether dimethicone (KF-6052 by Shin-Etsu Chemical Co., Ltd.), and 0.02 g of an antioxidant: dl-α-tocopherol (vitamin E-EFC by Kunisada Chemical Industry Co., Ltd.), which were stirred at 2,000 rpm by a homogenizing mixer for dissolution and dispersion. While stirring by a homogenizing disperser, 142 g of 0.67% NaCl aqueous solution was slowly added to the dispersion. After the entirety was added, the dispersion was stirred at 2,000 rpm whereupon the dispersion became of water-in-oil type and showed a viscosity buildup. Stirring was continued for a further 10 minutes, obtaining a white uniform W/O type emulsion.

To the thus obtained W/O type emulsion was added a mixture of methylvinylpolysiloxane of formula (1) and methylhydrogenpolysiloxane of formula (2). This was stirred at about 1,000 rpm by a homogenizing disperser, obtaining a W/O type emulsion liquid which was a 3-fold dilution of the W/O type emulsion. This emulsion liquid, 200 g, was slowly added to a 500-mL disposable cup which was previously charged with an aqueous solution of nonionic surfactants of fatty acid ester type: 1.9 g of POE (20) sorbitan monooleate (Rheodol TW-O120V by Kao Corp.) and 0.8 g of POE (6) sorbitan monooleate (Rheodol TW-O106V by Kao Corp.) in 65 g of water while stirring by a homogenizing disperser. After the entirety was added, the dispersion was stirred at 2,000 rpm whereupon the dispersion became of oil-in-water type and showed a viscosity buildup. Stirring was continued for a further 10 minutes, obtaining a white uniform W/O/W type emulsion.

Next, while stirring at about 1,000 rpm by a homogenizing mixer, 232 g of water was added to the W/O/W type emulsion, obtaining a W/O/W type emulsion liquid which was a dilution of the W/O/W type emulsion. The W/O/W type emulsion liquid was transferred to a 1-L volume disposable cup equipped with an agitator having an anchor impeller and conditioned at a temperature of 20-25° C. Thereafter, with stirring, a dissolution mixture of 0.3 g of a toluene solution of chloroplatinic acid-olefin complex (Pt content 0.5%) and 0.3 g of POE (9) lauryl ether (Emulgen 109P by Kao Corp.) was added to the emulsion liquid. Stirring was continued at the temperature for 5 hours to drive addition curing reaction to a full extent, yielding a water dispersion of spherical porous silicone rubber particles.

The spherical porous silicone rubber particles in the water dispersion were observed under an optical microscope Eclipse LV100POL (Nikon Corp.) to find that their shape was spherical and that a plurality of spherical or semispherical pores with a diameter of 0.5 to 4 μm were present on the particle surface. The particles had a volume average particle size of 5.6 μm as measured by an electric resistance method-based particle size distribution analyzer "Multisizer 3" (by Beckman Coulter).

The hardness of the spherical porous silicone rubber particles was measured as follows. First, methylvinyl(poly) siloxane of formula (1), methylhydrogen(poly)siloxane of formula (2) and a toluene solution of chloroplatinic acid-olefin complex (Pt content 0.5%) were mixed in the above-mentioned ratio and cast into an aluminum dish to a thickness of 10 mm. After the mixture was allowed to stand at 25° C. for 24 hours, it was heated in a thermostat tank at 50° C. for 1 hour, yielding a silicone rubber. The silicone rubber was removed from the aluminum dish and measured for hardness by Type A Durometer, finding a hardness of 70.

The water dispersion of spherical porous silicone rubber particles, 315 g, was transferred to a 1-L volume glass flask equipped with an agitator having an anchor impeller, to which 168 g of water, 8.9 g of 28% aqueous ammonia, and 0.4 g of 40% dimethyldiallylammonium chloride polymer aqueous solution (ME Polymer H40W, Toho Chemical Industry Co., Ltd.) were added. After the liquid was conditioned at a temperature of 5 to 10° C., 8.5 g of methyltrimethoxysilane (KBM-13, Shin-Etsu Chemical Co., Ltd.) was added dropwise over 20 minutes. While the liquid was kept at a temperature of 5 to 10° C., stirring was continued for a further 1 hour. The liquid was then heated at 55 to 60° C., and stirring was continued at the temperature for 1 hour to fully drive the hydrolysis and condensation reactions of methyltrimethoxysilane to completion.

The resulting water dispersion of porous silicone composite particles was passed through a pressure filter for water removal to a water content of about 30%. The dehydrated product was transferred to a 2-L volume glass flask equipped with an agitator having an anchor impeller, to which 1,000 mL of water was added. After stirring was continued for 30 minutes, the liquid was passed through a pressure filter for water removal. The dehydrated product was again transferred to a 2-L volume glass flask equipped with an agitator having an anchor impeller, to which 1,000 mL of water was added. After stirring was continued for 30 minutes, the liquid was passed through a pressure filter for water removal. Thereafter, the dehydrated product was dried in a vacuum dryer at a vacuum of 3×10$^{-3}$ Pa and a temperature of 100° C. for water removal. Finally, the dried product was disintegrated on a jet mill into free-flowing porous silicone composite particles.

The porous silicone composite particles thus obtained were dispersed in water with the aid of a surfactant and measured by an electric resistance method-based particle size distribution analyzer Multisizer 3 (by Beckman Coulter), finding a volume average particle size of 6 µm. The porous silicone composite particles were also observed under an electron microscope (scanning microscope S-4700 by Hitachi High-Technologies Corp.), finding that the particles bore a plurality of spherical or semispherical pores having a diameter of 0.5 to 4.0 µm on their surface. It was also seen that granular polymethylsilsesquioxane having a grain size of up to 100 nm was deposited on or anchored to the surface of porous silicone composite particles. The amount of polymethylsilsesquioxane deposited was 4.1% by weight based on 100% by weight of spherical porous silicone rubber particles.

Example 2

Preparation of Water Dispersion of Spherical Porous Silicone Rubber Particles Using Polyglycerol-Modified (Branched) Silicone A disposable cup of 500 mL volume was charged with 31 g of methylvinyl(poly)siloxane having a kinematic viscosity of 8.4 mm$^2$/s and represented by the formula (1), 17 g (an amount to provide 1.13 hydrosilyl groups per aliphatic unsaturated group) of methylhydrogen(poly)siloxane having a kinematic viscosity of 28 mm$^2$/s and represented by the formula (2), 4 g of polyglycerol-modified branched silicone: lauryl polyglyceryl-3 polydimethylsiloxyethyl dimethicone (KF-6105 by Shin-Etsu Chemical Co., Ltd.), and 0.02 g of an antioxidant: dl-α-tocopherol, which were stirred at 2,000 rpm by a homogenizing mixer for dissolution and dispersion. While stirring by a homogenizing disperser, 148 g of 0.67% NaCl aqueous solution was slowly added to the dispersion. After the entirety was added, the dispersion was stirred at 4,000 rpm whereupon the dispersion became of water-in-oil type and showed a viscosity buildup. Stirring was continued for a further 10 minutes, obtaining a white uniform W/O type emulsion.

To the thus obtained W/O type emulsion was added a mixture of methylvinylpolysiloxane of formula (1) and methylhydrogenpolysiloxane of formula (2). This was stirred at about 1,000 rpm by a homogenizing disperser, obtaining a W/O type emulsion liquid which was a 3-fold dilution of the W/O type emulsion. This emulsion liquid, 200 g, was slowly added to a 500-mL disposable cup which was previously charged with an aqueous solution of nonionic surfactants of fatty acid ester type: 1.9 g of POE (20) sorbitan monooleate and 0.8 g of POE (6) sorbitan monooleate in 65 g of water, while stirring by a homogenizing disperser. After the entirety was added, the dispersion was stirred at 2,000 rpm whereupon the dispersion became of oil-in-water type and showed a viscosity buildup. Stirring was continued for a further 10 minutes, obtaining a white uniform W/O/W type emulsion. Next, while stirring at about 1,000 rpm by a homogenizing mixer, 232 g of 0.86% NaCl aqueous solution was added to the W/O/W type emulsion, obtaining a W/O/W type emulsion liquid which was a dilution of the W/O/W type emulsion.

The W/O/W type emulsion liquid was transferred to a 1-L volume disposable cup equipped with an agitator having an anchor impeller and conditioned at a temperature of 20-25° C. Thereafter, with stirring, a dissolution mixture of 0.3 g of a toluene solution of chloroplatinic acid-olefin complex (Pt content 0.5%) and 0.3 g of POE (9) lauryl ether was added to the emulsion liquid. Stirring was continued at the temperature for 5 hours to drive addition curing reaction to a full extent, yielding a water dispersion of spherical porous silicone rubber particles.

The spherical porous silicone rubber particles in the water dispersion were observed under an optical microscope Eclipse LV100POL to find that their shape was spherical and that the particles bore a plurality of spherical or semispherical pores with a diameter of 0.5 to 4.0 µm on their surface. The particles had a volume average particle size of 14 µm as measured by an electric resistance method-based particle size distribution analyzer Multisizer 3.

The hardness of the spherical porous silicone rubber particles was measured by the same method as above. A hardness of 70 was measured by Type A Durometer.

The water dispersion of spherical porous silicone rubber particles, 315 g, was transferred to a 1-L volume glass flask equipped with an agitator having an anchor impeller. By using the same reagents, amounts and conditions and performing the same procedure as in Example 1, the hydrolysis and condensation reactions of methyltrimethoxysilane were fully driven to completion.

The resulting water dispersion of porous silicone composite particles was passed through a pressure filter for water removal to a water content of about 30%. The dehydrated product was transferred to a 2-L volume glass flask equipped with an agitator having an anchor impeller. By performing the same procedure under the same conditions as in Example 1, water was removed. Finally, the dried product was disintegrated on a jet mill into free-flowing porous silicone composite particles.

The porous silicone composite particles thus obtained were dispersed in water with the aid of a surfactant and measured by an electric resistance method-based particle size distribution analyzer Multisizer 3, finding a volume average particle size of 15 µm. The porous silicone composite particles were also observed under an electron microscope (scanning microscope S-4700), finding that the particles bore a plurality of spherical or semispherical pores having a diameter of 0.5 to 4.0 µm on their surface. It was also seen that granular polymethylsilsesquioxane having a grain size of up to 100 nm was deposited on or anchored to the surface of porous silicone composite particles. The amount of polymethylsilsesquioxane deposited was 4.1% by weight based on 100% by weight of spherical porous silicone rubber particles.

Example 3

Preparation of Water Dispersion of Spherical Porous Silicone Rubber Particles Using Polyether-Modified (Crosslinked) Silicone Gel A disposable cup of 500 mL volume was charged with 31 g of methylvinyl(poly)siloxane having a kinematic viscosity of 8.4 mm$^2$/s and represented by the formula (1), 17 g (an amount to provide 1.13 hydrosilyl groups per aliphatic unsaturated group) of methylhydrogen(poly)siloxane having a kinematic viscosity of 28 mm$^2$/s and represented by the formula (2), 15 g of polyether-modified silicone gel: dimethicone/PEG-10/15 crosspolymer (KSG-210 by Shin-Etsu Chemical Co., Ltd.), and 0.02 g of an antioxidant: dl-α-tocopherol, which were stirred at 2,000 rpm by a homogenizing mixer for dissolution and dispersion. While stirring by a homogenizing disperser, 137 g of 0.25% NaCl aqueous solution was slowly added to the dispersion. After the entirety was added, the dispersion was stirred at 4,000 rpm whereupon the dispersion became of water-in-oil type and showed a viscosity buildup. Stirring was continued for a further 10 minutes, obtaining a white uniform W/O type emulsion.

To the thus obtained W/O type emulsion was added a mixture of methylvinylpolysiloxane of formula (1) and methylhydrogenpolysiloxane of formula (2). This was stirred at about 1,000 rpm by a homogenizing disperser, obtaining a W/O type emulsion liquid which was a 2-fold dilution of the W/O type emulsion. This emulsion liquid, 200 g, was slowly added to a 500-mL disposable cup which was previously charged with an aqueous solution of surfactant: 1.5 g of POE (9) lauryl ether (Emulgen 109P by Kao Corp.) in 65 g of water, while stirring by a homogenizing disperser. After the entirety was added, the dispersion was stirred at 4,000 rpm whereupon the dispersion became of oil-in-water type and showed a viscosity buildup. Stirring was continued for a further 10 minutes, obtaining a white uniform W/O/W type emulsion.

Next, while stirring at about 1,000 rpm by a homogenizing mixer, 232 g of 0.32% NaCl aqueous solution was added to the W/O/W type emulsion, obtaining a W/O/W type emulsion liquid. The W/O/W type emulsion liquid was transferred to a 1-L volume disposable cup equipped with an agitator having an anchor impeller and conditioned at a temperature of 20-25° C. Thereafter, with stirring, a dissolution mixture of 0.3 g of a toluene solution of chloroplatinic acid-olefin complex (Pt content 0.5%) and 0.3 g of POE (9) lauryl ether was added to the emulsion liquid. Stirring was continued at the temperature for 5 hours to drive addition curing reaction to a full extent, yielding a water dispersion of spherical porous silicone rubber particles.

The spherical porous silicone rubber particles in the water dispersion were observed under an optical microscope Eclipse LV100POL to find that their shape was spherical and that the particles bore a plurality of spherical or semispherical pores with a diameter of 0.5 to 3.0 μm on their surface. The particles had a volume average particle size of 28 μm as measured by an electric resistance method-based particle size distribution analyzer Multisizer 3.

The hardness of the spherical porous silicone rubber particles was measured by the same method as above. A hardness of 70 was measured by Type A Durometer.

The water dispersion of spherical porous silicone rubber particles, 315 g, was transferred to a 1-L volume glass flask equipped with an agitator having an anchor impeller. By using the same reagents, amounts and conditions and performing the same procedure as in Example 1, the hydrolysis and condensation reactions of methyltrimethoxysilane were fully driven to completion.

The resulting water dispersion of porous silicone composite particles was passed through a pressure filter for water removal to a water content of about 30%. The dehydrated product was transferred to a 2-L volume glass flask equipped with an agitator having an anchor impeller. By performing the same procedure under the same conditions as in Example 1, water was removed. Finally, the dried product was disintegrated on a jet mill into free-flowing porous silicone composite particles.

The porous silicone composite particles thus obtained were dispersed in water with the aid of a surfactant and measured by an electric resistance method-based particle size distribution analyzer Multisizer 3, finding a volume average particle size of 29 μm. The porous silicone composite particles were also observed under an electron microscope (scanning microscope S-4700), finding that the particles bore a plurality of spherical or semispherical pores having a diameter of 0.5 to 3.0 μm on their surface. It was also seen that granular polymethylsilsesquioxane having a grain size of up to 100 nm was deposited on or anchored to the surface of porous silicone composite particles. The amount of polymethylsilsesquioxane deposited was 4.1% by weight based on 100% by weight of spherical porous silicone rubber particles.

Example 4

Preparation of Water Dispersion of Spherical Porous Silicone Rubber Particles Using Nonionic/Anionic Surfactant Mixture A disposable cup of 500 mL volume was charged with 31 g of methylvinylpolysiloxane having a kinematic viscosity of 8.4 mm$^2$/s and represented by the formula (1), 17 g (an amount to provide 1.13 hydrosilyl groups per aliphatic unsaturated group) of methylhydrogenpolysiloxane having a kinematic viscosity of 28 mm$^2$/s and represented by the formula (2), 20 g of polyether-modified silicone gel: dimethicone/PEG-10/15 crosspolymer (KSG-210 by Shin-Etsu Chemical Co., Ltd.), and 0.02 g of an antioxidant: dl-α-tocopherol, which were stirred at 2,000 rpm by a homogenizing mixer for dissolution and dispersion. While stirring by a homogenizing disperser, 132 g of 0.25% NaCl aqueous solution was slowly added to the dispersion. After the entirety was added, the dispersion was stirred at 4,000 rpm whereupon the dispersion became of water-in-oil type and showed a viscosity buildup. Stirring was continued for a further 10 minutes, obtaining a white uniform W/O type emulsion.

To the thus obtained W/O type emulsion was added a mixture of methylvinylpolysiloxane of formula (1) and methylhydrogenpolysiloxane of formula (2). This was stirred at about 1,000 rpm by a homogenizing disperser, obtaining a W/O type emulsion liquid which was a 2-fold dilution of the W/O type emulsion. This emulsion liquid, 200 g, was slowly added to a 500-mL disposable cup which was previously charged with an aqueous solution of surfactants: 1.05 g of POE (9) lauryl ether, 0.15 g of POE (23) lauryl ether (Emulgen 123P by Kao Corp.) and 1.2 g of POE (3) sodium lauryl ether sulfate (Emal 20C by Kao Corp.) in 30 g of water, while stirring by a homogenizing mixer. After the entirety was added, the dispersion was stirred at 2,000 rpm whereupon the dispersion became of oil-in-water type and showed a viscosity buildup. Stirring was continued for a further 10 minutes, obtaining a white uniform W/O/W type emulsion. Next, while stirring at about 1,000 rpm by a homogenizing mixer, 267 g of 0.32% NaCl aqueous solution was added to the W/O/W type emulsion, obtaining a W/O/W type emulsion liquid which was a dilution of the W/O/W type emulsion.

The W/O/W type emulsion liquid was transferred to a 1-L volume disposable cup equipped with an agitator having an anchor impeller and conditioned at a temperature of 20-25° C. Thereafter, with stirring, a dissolution mixture of 0.3 g of a toluene solution of chloroplatinic acid-olefin complex (Pt content 0.5%) and 0.3 g of POE (9) lauryl ether was added to the emulsion liquid. Stirring was continued at the temperature for 5 hours to drive addition curing reaction to a full extent, yielding a water dispersion of spherical porous silicone rubber particles.

The spherical porous silicone rubber particles in the water dispersion were observed under an optical microscope Eclipse LV100POL to find that their shape was spherical and that the particles bore a plurality of spherical or semispherical pores with a diameter of 0.5 to 3.0 μm on their surface. The particles had a volume average particle size of 13 μm as measured by an electric resistance method-based particle size distribution analyzer Multisizer 3.

The hardness of the spherical porous silicone rubber particles was measured by the same method as above. A hardness of 70 was measured by Type A Durometer.

The water dispersion of spherical porous silicone rubber particles, 315 g, was transferred to a 1-L volume glass flask equipped with an agitator having an anchor impeller. By using the same reagents, amounts and conditions and performing the same procedure as in Example 1, the hydrolysis and condensation reactions of methyltrimethoxysilane were fully driven to completion.

The resulting water dispersion of porous silicone composite particles was passed through a pressure filter for water removal to a water content of about 30%. The dehydrated product was transferred to a 2-L volume glass flask equipped with an agitator having an anchor impeller. By performing the same procedure under the same conditions as in Example 1, water was removed. Finally, the dried product was disintegrated on a jet mill into free-flowing porous silicone composite particles.

The porous silicone composite particles thus obtained were dispersed in water with the aid of a surfactant and measured by an electric resistance method-based particle size distribution analyzer Multisizer 3, finding a volume average particle size of 13 μm. The porous silicone composite particles were also observed under an electron microscope (scanning microscope S-4700), finding that the particles bore a plurality of spherical or semispherical pores having a diameter of 0.5 to 3.0 μm on their surface. It was also seen that granular polymethylsilsesquioxane having a grain size of up to 100 nm was deposited on or anchored to the surface of porous silicone composite particles. The amount of polymethylsilsesquioxane deposited was 4.1% by weight based on 100% by weight of spherical porous silicone rubber particles.

Figure 1:
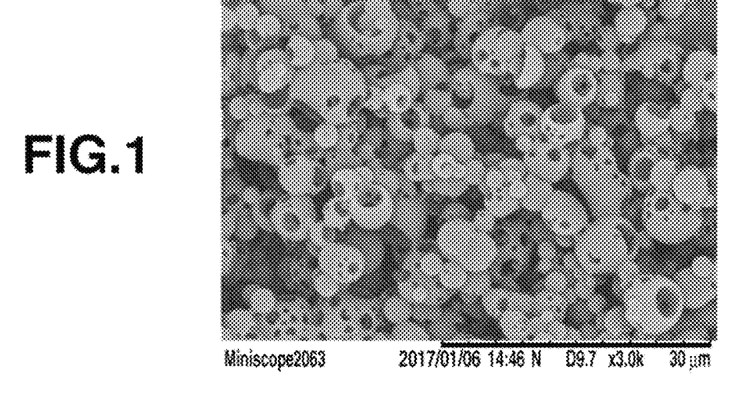
FIG. 1 is an electron photomicrograph of surfaces of spherical porous silicone rubber particles obtained in Example 1.

FIG. 1 is an electron photomicrograph of surfaces of spherical porous silicone rubber particles obtained in Example 1.

Figure 2:
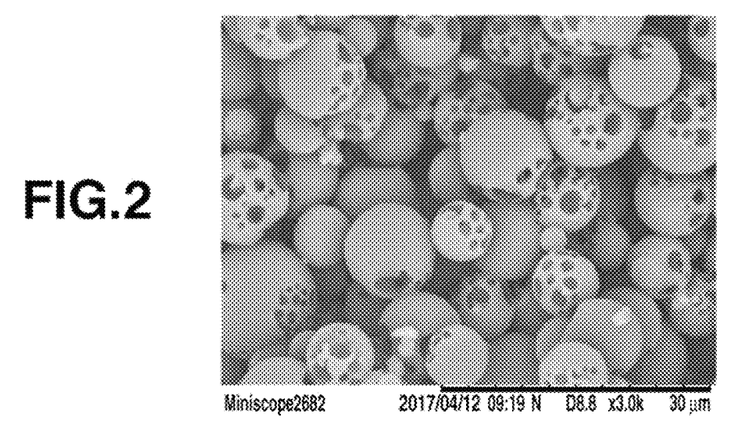
FIG. 2 is an electron photomicrograph of surfaces of spherical porous silicone rubber particles obtained in Example 2.

FIG. 2 is an electron photomicrograph of surfaces of spherical porous silicone rubber particles obtained in Example 2.

Figure 3:
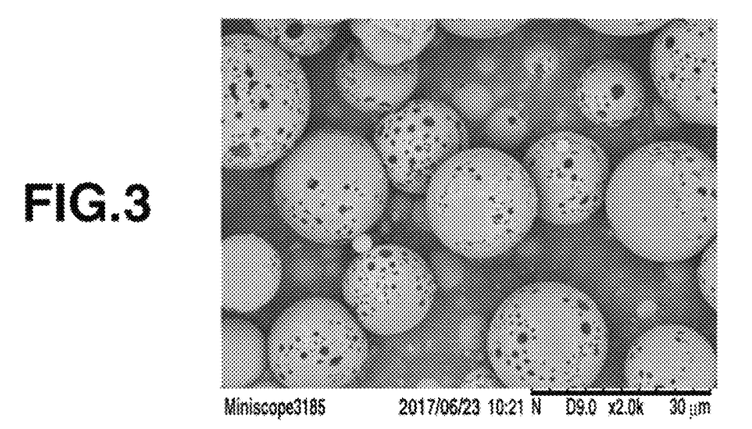
FIG. 3 is an electron photomicrograph of surfaces of spherical porous silicone rubber particles obtained in Example 3.

FIG. 3 is an electron photomicrograph of surfaces of spherical porous silicone rubber particles obtained in Example 3.

Figure 4:
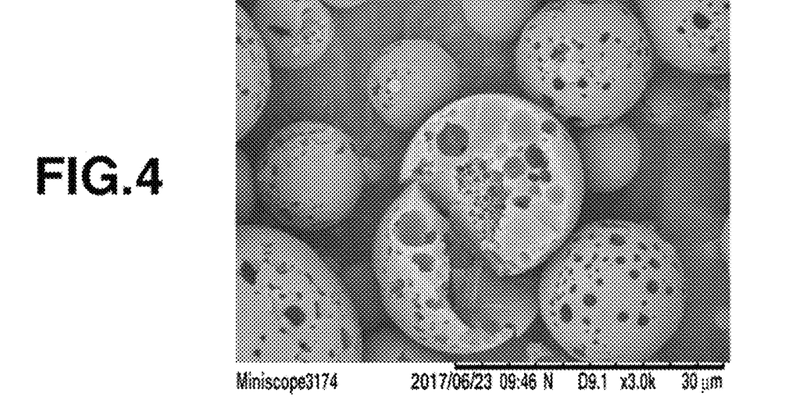
FIG. 4 is an electron photomicrograph in cross-section of spherical porous silicone rubber particles obtained in Example 3.

FIG. 4 is an electron photomicrograph in cross-section of spherical porous silicone rubber particles obtained in Example 3.

Figure 5:
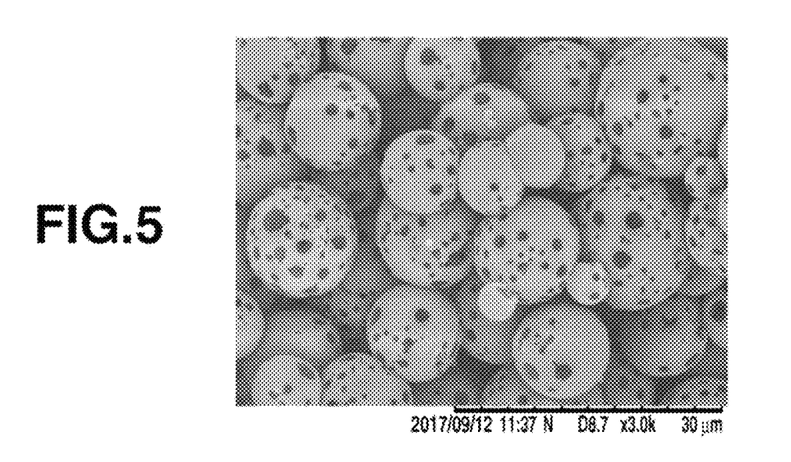
FIG. 5 is an electron photomicrograph of surfaces of spherical porous silicone rubber particles obtained in Example 4.

FIG. 5 is an electron photomicrograph of surfaces of spherical porous silicone rubber particles obtained in Example 4.

Figure 6:
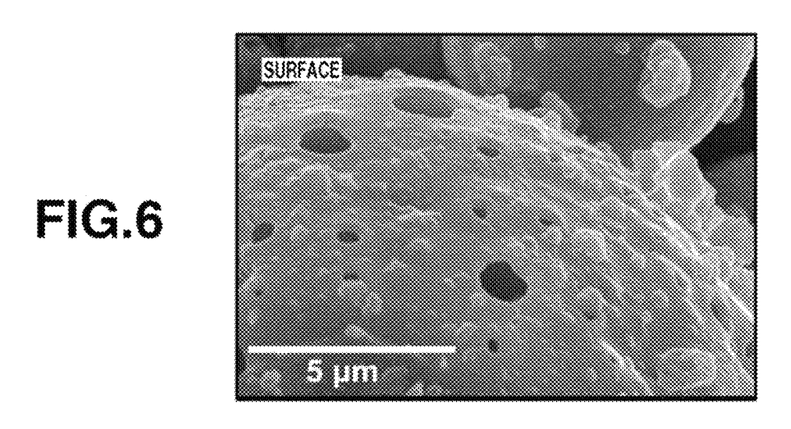
FIG. 6 is an electron photomicrograph of surfaces of porous silicone composite particles obtained in Example 3.

FIG. 6 is an electron photomicrograph of surfaces of porous silicone composite particles obtained in Example 3.

Figure 7:
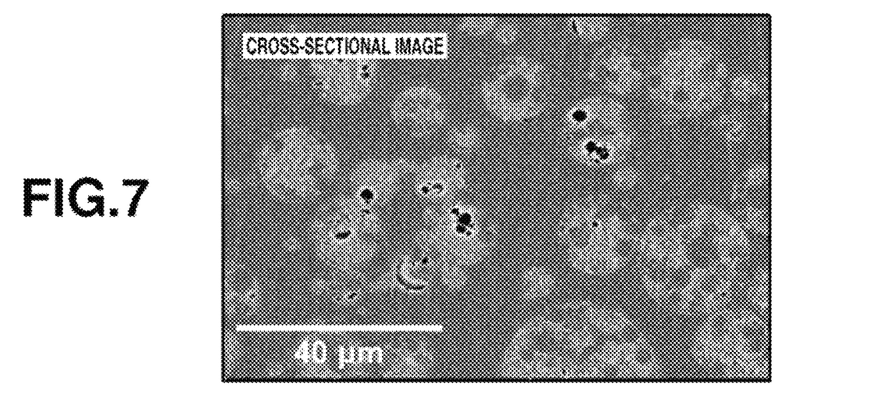
FIG. 7 is an electron photomicrograph in cross-section of porous silicone composite particles obtained in Example 3.

FIG. 7 is an electron photomicrograph in cross-section of porous silicone composite particles obtained in Example 3.

Figure 8:
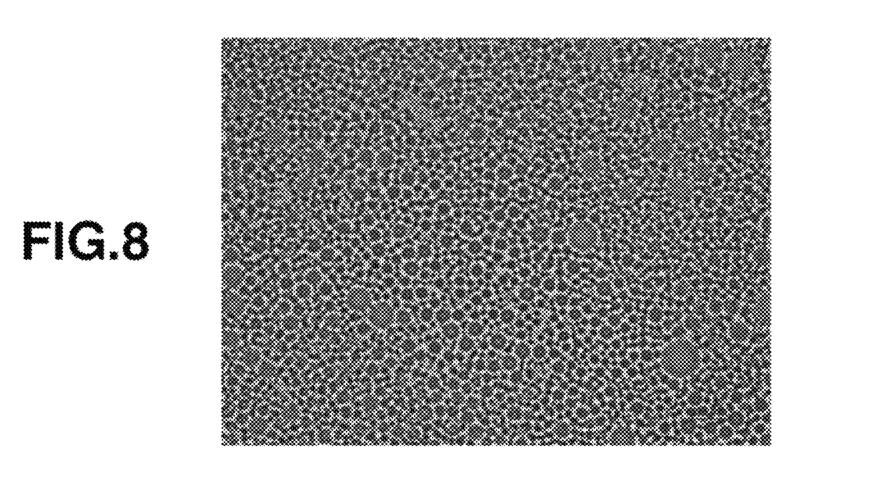
FIG. 8 is an electron photomicrograph of the W/O emulsion obtained in Example 3.

FIG. 8 is an electron photomicrograph of the W/O emulsion obtained in Example 3.

Figure 9:
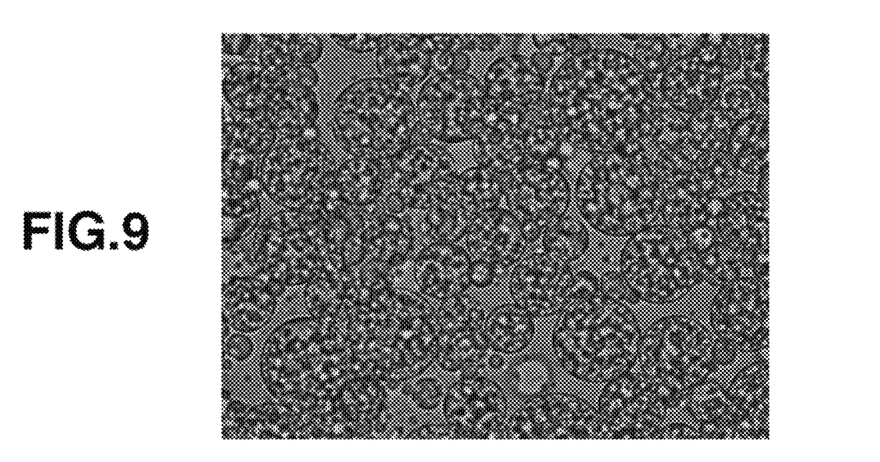
FIG. 9 is an electron photomicrograph of the W/O/W emulsion obtained in Example 3.

FIG. 9 is an electron photomicrograph of the W/O/W emulsion obtained in Example 3.

Figure 10:
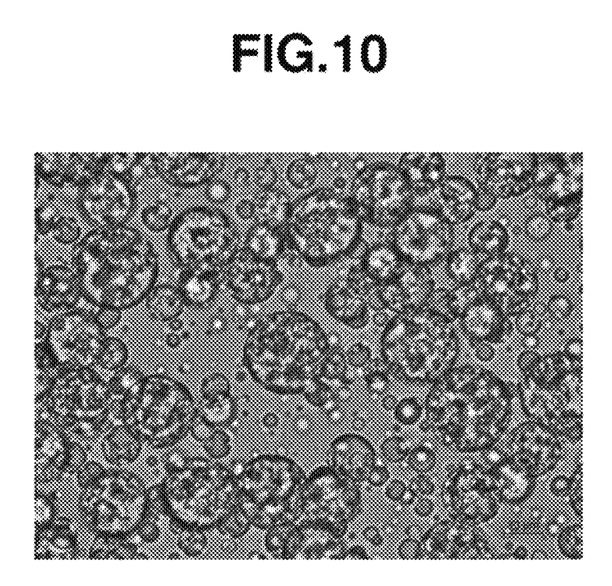
FIG. 10 is an electron photomicrograph of the water dispersion of spherical porous silicone rubber particles obtained in Example 3.

FIG. 10 is an electron photomicrograph of the water dispersion of spherical porous silicone rubber particles obtained in Example 3.

INDUSTRIAL APPLICABILITY

The spherical porous silicone rubber particles and the porous silicone composite particles according to the invention have high light scattering and oil absorbing properties by virtue of their characteristic structure, and are expected to be useful in cosmetics and the like.

The invention claimed is:

1. A method for preparing spherical porous silicone rubber particles having pores in the interior or on the surface thereof, comprising the steps of:
    (i) obtaining a W/O (inner water phase/oil phase) emulsion consisting of an inner water phase component and an oil phase component composed of a curable liquid silicone composition,
    (ii) obtaining a W/O/W (inner water phase/oil phase/outer water phase) emulsion consisting of the W/O emulsion obtained in step (i) and an outer water phase component using a surfactant (ii), the content of the surfactant (ii) being 0.01 to 10 parts by weight per 100 parts by weight of the W/O emulsion,
    (iii) curing the curable liquid silicone composition constituting the oil phase in the W/O/W emulsion obtained in step (ii) in the presence of a catalyst, for yielding a water dispersion of spherical porous silicone rubber particles, and
    (iv) removing water in the outer phase and water in the spherical porous silicone rubber particles from the water dispersion of spherical porous silicone rubber particles obtained in step (iii).

2. A method for preparing porous silicone composite particles, comprising
    spherical porous silicone rubber particles having pores in the interior or on the surface thereof and spherical polyorganosilsesquioxane deposited on the surface thereof in an amount of 1 to 25% by weight relative to 100% by weight of the spherical porous silicone rubber particles,
    comprising the step of:
    subjecting an organotrialkoxysilane to hydrolysis and condensation reactions in the presence of the spherical porous silicone rubber particles obtained from the method of claim 1, water, and an alkaline substance, for thereby depositing polyorganosilsesquioxane onto the surface of the spherical porous silicone rubber particles.

3. The method of claim 2, wherein the composite particles have a volume average particle size of 0.5 to 100 μm and the pores are spherical or semispherical and have a diameter of 0.2 to 30 μm.

4. The method of claim 2, wherein the silicone rubber is the addition reaction product of an organo(poly)siloxane having at least two silicon-bonded monovalent aliphatic unsaturated groups per molecule with an organohydrogen(poly)siloxane having at least two silicon-bonded hydrogen atoms per molecule, with the proviso that the monovalent aliphatic unsaturated groups and/or the hydrogen atoms are present at least three per molecule.

5. The method of claim 2, wherein in the step (i), the curable liquid silicone composition comprises a surfactant of step (i).

6. The method of claim 5, wherein the surfactant of step (i) is silicone-based surfactant.

7. The method of claim 5, wherein the surfactant of step (i) is silicone-based surfactants selected from the group consisting of polyether-modified silicones, polyglycerol-modified silicones, polyether/alkyl-co-modified silicones, polyglycerol/alkyl co-modified silicones, polyether/silicone/alkyl-co-modified silicones, and polyglycerol/silicone/alkyl-co-modified silicones.

8. The method of claim 5, wherein the surfactant of step (ii) has a HLB value of at least 8, and a higher HLB value than the HLB value of the surfactant of step (i).

9. The method of claim 2, wherein the surfactant of step (ii) is a nonionic surfactant.

10. The method of claim 2, wherein the surfactant of step (ii) is a polyoxyethylene surfactant having a polyoxyethylene group.

11. The method of claim 1, wherein the particles have a volume average particle size of 0.5 to 100 μm and the pores are spherical or semispherical and have a diameter of 0.2 to 30 μm.

12. The method of claim 1, wherein the silicone rubber is the addition reaction product of an organo(poly)siloxane having at least two silicon-bonded monovalent aliphatic unsaturated groups per molecule with an organohydrogen(poly)siloxane having at least two silicon-bonded hydrogen atoms per molecule, with the proviso that the monovalent aliphatic unsaturated groups and/or the hydrogen atoms are present at least three per molecule.

13. The method of claim 1, wherein in the step (i), the curable liquid silicone composition comprises a surfactant of step (i).

14. The method of claim 13, wherein the surfactant of step (i) is a silicone-based surfactant.

15. The method of claim 13, wherein the surfactant of step (i) is a silicone-based surfactant selected from the group consisting of polyether-modified silicones, polyglycerol-modified silicones, polyether/alkyl-co-modified silicones, polyglycerol/alkyl co-modified silicones, polyether/silicone/alkyl-co-modified silicones, and polyglycerol/silicone/alkyl-co-modified silicones.

16. The method of claim 13, wherein the surfactant of step (ii) has a HLB value of at least 8, and a higher HLB value than the HLB value of the surfactant of step (i).

17. The method of claim 1, wherein the surfactant of step (ii) is a nonionic surfactant.

18. The method of claim 1, wherein the surfactant of step (ii) is a polyoxyethylene surfactant having a polyoxyethylene group.

* * * * *